United States Patent
Gibson et al.

(10) Patent No.: US 8,862,355 B2
(45) Date of Patent: Oct. 14, 2014

(54) METHOD AND SYSTEM FOR ENGINE CONTROL

(75) Inventors: Alex O'Connor Gibson, Ann Arbor, MI (US); Chad Everette Griffin, Pinckney, MI (US); Felix Nedorezov, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 119 days.

(21) Appl. No.: 13/166,617

(22) Filed: Jun. 22, 2011

(65) Prior Publication Data

US 2012/0330522 A1    Dec. 27, 2012

(51) Int. Cl.
    G06F 7/70    (2006.01)
    B60W 10/115  (2012.01)
    B60W 10/18   (2012.01)
    B60W 10/06   (2006.01)
    B60W 30/18   (2012.01)
    B60W 10/30   (2006.01)

(52) U.S. Cl.
    CPC ........... *B60W 10/182* (2013.01); *B60W 10/115* (2013.01); *B60W 2520/10* (2013.01); *B60W 10/06* (2013.01); *B60W 2510/0638* (2013.01); *B60W 30/18018* (2013.01); *B60W 10/30* (2013.01); *B60W 2710/305* (2013.01); *B60W 2540/12* (2013.01); *B60Y 2300/90* (2013.01)
    USPC ............... 701/70; 701/77; 701/102; 701/103; 701/112; 303/122.03; 303/155; 303/186; 303/20; 303/3; 290/31; 290/38 C; 290/38 E; 290/40 A; 123/179.1; 123/1 A; 123/304; 123/337; 123/431

(58) Field of Classification Search
    CPC ..... B60T 8/1755; B60T 8/172; B60W 10/184
    USPC ......... 701/67, 123, 22, 36, 54, 37, 58, 70, 77, 701/102, 103, 112, 113, 29.2; 123/179, 1 A, 123/304, 337, 406, 431; 477/175, 4.5, 114; 180/65.2; 290/31, 38 C, 38 E, 40 A; 303/122.03, 155, 186, 20, 3
    See application file for complete search history.

(56) References Cited

U.S. PATENT DOCUMENTS 4,131,304 A * 12/1978 Wagner ...................... 290/38 C
6,135,920 A   10/2000 Kamiya et al.
(Continued)

FOREIGN PATENT DOCUMENTS

JP    2007138720 A  *  6/2007

OTHER PUBLICATIONS

JPO Machine Trasnslation—jp2007-138720 (for citation purposes).*

*Primary Examiner* — Helal A Algahaim
*Assistant Examiner* — Jelani Smith
(74) *Attorney, Agent, or Firm* — Julia Voutyras; Alleman Hall McCoy Russell & Tuttle LLP

(57) ABSTRACT

Systems and methods are provided for restarting an engine that can be selectively deactivated during idle-stop conditions. In one embodiment, current is directed to a starter motor and an electric brake sequentially by limiting the current supplied to one while current is supplied to the other, an order of delivering the current based on a timing of a restart request relative to an electric brake request, as well as vehicle operating conditions at the time the requests were received. By coordinating the operation of a starter motor with the operation of an electric brake, loading of the engine system's electrical supply can be reduced.

13 Claims, 5 Drawing Sheets

(56) References Cited

U.S. PATENT DOCUMENTS

| | | |
|---|---|---|
| 6,202,776 B1 * | 3/2001 | Masberg et al. .......... 180/65.22 |
| 6,358,180 B1 * | 3/2002 | Kuroda et al. ................... 477/4 |
| 6,739,418 B2 * | 5/2004 | Ogata et al. ............ 180/65.245 |
| 6,763,903 B2 * | 7/2004 | Morimoto et al. ........ 180/65.26 |
| 7,585,250 B2 | 9/2009 | Braun et al. |
| 2002/0086772 A1 | 7/2002 | Abe et al. |
| 2003/0004635 A1 * | 1/2003 | Kamiya et al. ............... 701/112 |
| 2004/0113489 A1 * | 6/2004 | Iwagawa et al. ............. 303/155 |
| 2005/0197235 A1 * | 9/2005 | Boe et al. ..................... 477/107 |
| 2006/0079377 A1 * | 4/2006 | Steen et al. ................... 477/186 |
| 2006/0184304 A1 * | 8/2006 | Katou et al. .................... 701/54 |
| 2007/0078040 A1 * | 4/2007 | Nobumoto et al. ............. 477/70 |
| 2007/0170775 A1 | 7/2007 | Uchimura et al. |
| 2007/0170778 A1 * | 7/2007 | Yamaguchi .................. 307/10.1 |
| 2007/0200424 A1 | 8/2007 | Sakai |
| 2008/0039288 A1 * | 2/2008 | Jagodzinski .................. 477/197 |
| 2008/0190680 A1 * | 8/2008 | Kaneko et al. ................ 180/170 |
| 2010/0076656 A1 * | 3/2010 | Hiyoshi et al. ................. 701/70 |
| 2011/0260529 A1 * | 10/2011 | Zahdeh ........................ 307/10.1 |
| 2011/0266106 A1 * | 11/2011 | Suzuki .......................... 188/360 |
| 2011/0270501 A1 * | 11/2011 | Ito et al. ......................... 701/70 |

* cited by examiner

METHOD AND SYSTEM FOR ENGINE CONTROL

FIELD

The present application relates to methods and systems for controlling an engine shut-down responsive to idle-stop conditions, and a subsequent engine restart from the idle-stop.

BACKGROUND AND SUMMARY

Vehicles have been developed to perform an engine idle-stop when idle-stop conditions are met and then automatically restart the engine when restart conditions are met. The engine may be restarted with assistance from a starter motor, for example. Such idle-stop systems enable fuel savings, reduction in exhaust emissions, reduction in noise, and the like. Vehicle systems may include a parking brake, in addition to wheel brakes, to assist in keeping the vehicle stationary when parked, in particular, when parked on an incline. During an engine restart on an incline, the engagement of the parking brake may be coordinated with the cranking of the engine to prevent the vehicle from rolling backwards.

One example of such coordination is illustrated by Hiyoshi et al. in U.S. 2010/0076656 A1. Therein, a parking brake device is actuated prior to an automatic start of the engine, and an engine starter is operated only after it has been confirmed that the brakes are being held. The brakes are released after a predetermined amount of time has elapsed since the restart of the engine.

However, the inventors herein have identified a potential issue with such an approach. As one example, the parking brake device of Hiyoshi et al. uses a compressed air flow to apply the braking force. The need for a compressor to provide the compressed air adds component costs to the vehicle system.

In one example, component costs may be reduced by using an electronically actuated parking brake (also referred to as an electric brake or eBrake) in place of the compressed air-based brake device of Hiyoshi. A current drawn from the vehicle's existing electrical supply may be used to apply and/or release the electric brake to assist in keeping the vehicle stationary when parked. However, since operation of the electric brake requires a current to be drawn, the electric brake and the starter motor cannot be operated simultaneously. For example, if the vehicle operator releases his foot from a wheel brake pedal while requesting parking brake assistance, the starter motor may be operated to restart the engine (in response to the brake pedal release) at the same time as the electric brake is engaged. As such, the electrical supply of the vehicle (e.g., battery) may not be able to provide sufficient current to operate both the starter motor and the brake, leading to degraded engine restart quality and degraded brake assistance.

Thus, in one example, some of the above issues may be at least partly addressed by a method of operating a vehicle engine coupled to a transmission and an electrically-actuated brake. In one embodiment, the method comprises, limiting current supplied to one of a starter and an electric parking brake in response to a request to supply current, or while current is being supplied, to the other of the starter and the electric parking brake. In this way, during some conditions, current may be directed to the starter to crank the engine before current is supplied to apply the electric brake. During other conditions, application of the electric brake may be completed before current is directed to operate the starter motor.

In one example, directing current sequentially to the starter motor and the electric brake may include selecting an order of limiting the current based on a timing of the brake request (that is, a request to supply current to the electric brake) relative to the restart request (that is, a request to supply current to the starter motor). As such, an electric brake request may be inferred, for example, in response to a vehicle operator pressing an ebrake button on the vehicle's dashboard. An engine restart request may be inferred, for example, in response to a vehicle operator releasing a wheel brake pedal. For example, when the restart request is received after the electric brake request, current supplied to the starter may be limited. Alternatively, if the restart request is received before the electric brake request, the current supplied to the electric brake may be limited.

In this way, by directing current to the starter and the electric brake sequentially, both the starter motor and the electric brake can be operated without draining excess current from the vehicle system's electrical supply, thereby improving the quality of the engine restart as well as the parking brake assist.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
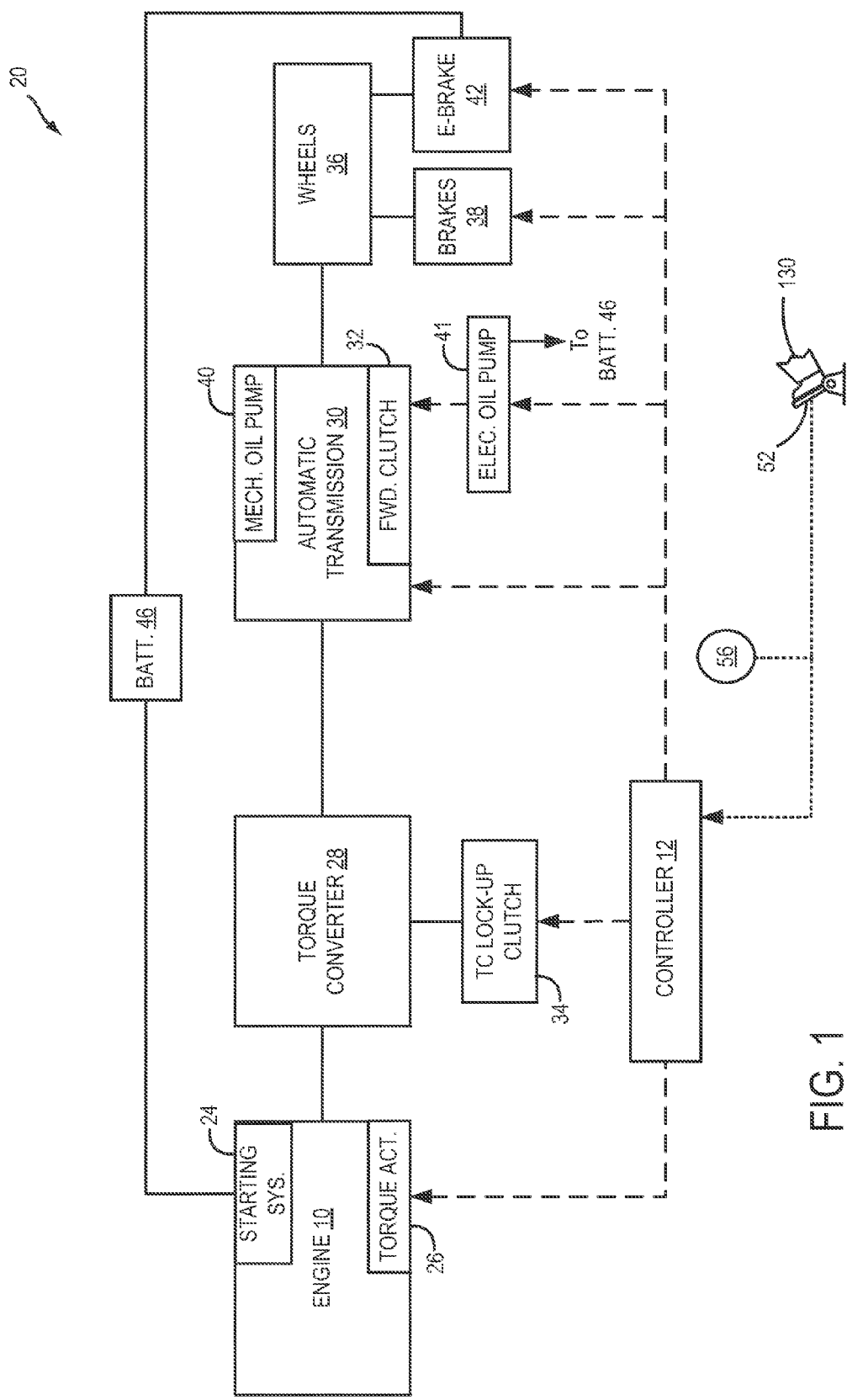
FIG. 1 shows an example vehicle system layout, including details of a vehicle drive-train.
Figure 2:
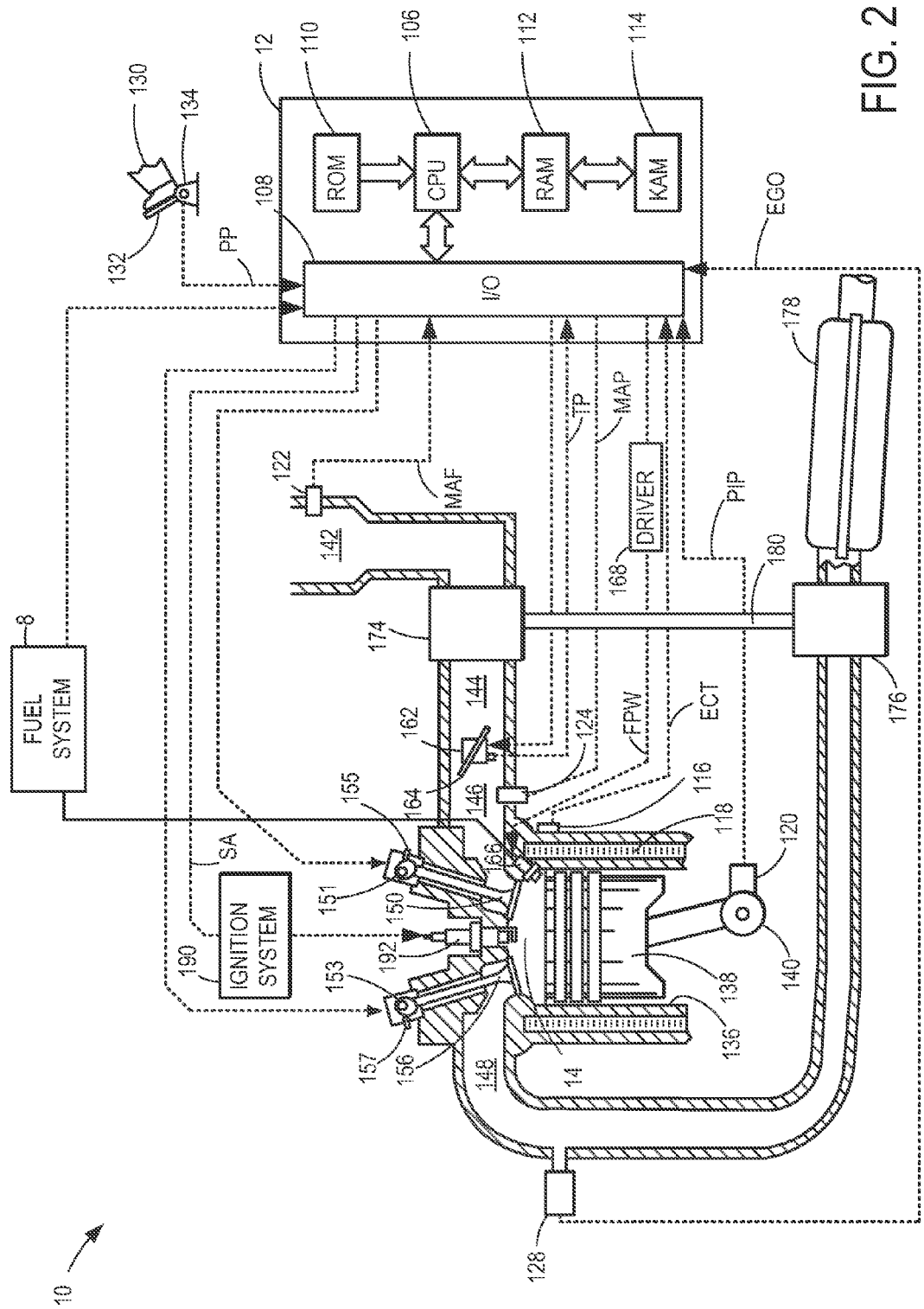
FIG. 2 shows a partial engine view.

The following description relates to a vehicle engine system that is selectively deactivatable in response to idle-stop conditions (such as the engine system of FIGS. 1-2). The engine system may be coupled to a transmission and wheel brakes, and further coupled to an electric brake. During idle-stop conditions, based on a vehicle speed at which an electric brake request is received, current may be directed to the electric brake to hold the vehicle stationary. During restart conditions, current may be directed to a starter motor and the electric brake sequentially, the order of directing current based at least on an order in which the requests are received, and further based on an engine speed at the time of the requests. An engine controller may be configured to perform a control routine, such as the routine of FIG. 3, to shut-down the engine in response to idle-stop conditions with the transmission tied to a case of the transmission. The engine controller may be further configured to perform a control routine, such as the routine of FIG. 4, to limit current to one of a starter and the electric brake in response to a request to supply current, or while current is being supplied, to the other of the starter and the electric brake. Additionally, the controller may release the transmission from the tie-up state in response to the engine restart request and/or an application of the electric brake. The concepts and routines introduced herein are further clarified with example engine shutdown and restart scenarios in FIG. 5. In this way, an engine restart may be coordinated with an electric brake operation without draining an engine system's electrical supply.

FIG. 1 is a block diagram of a vehicle drive-train 20. Drive-train 20 may be powered by engine 10. Engine 10 may be started with an engine starting system 24, including a starter. The starter may be configured to support engine restart at or below a predetermined near zero threshold speed (for example at or below 100 rpm). Alternatively, the predetermined threshold speed may be a speed range, for example 50 to 100 rpm. The starter may include a starter motor that is operated in response to a current received from a system electrical supply, such as battery 46. In response to an engine restart request, current may be directed from the battery to the starter motor to crank the engine, following which the current may be released. In one example, an engine restart request may be inferred based on the position of a brake pedal 52, specifically, in response to a vehicle operator 130 releasing their foot from brake pedal 52.

Engine 10 may also generate or adjust torque via torque actuator 26, such as a fuel injector, throttle, etc. Engine 10 may be coupled to a transmission via a torque converter. Specifically, the engine output torque may be transmitted to torque converter 28 to drive an automatic transmission 30. Further, one or more transmission clutches may be engaged, including forward clutch 32, to propel a vehicle. In one example, the torque converter may be referred to as a component of the transmission. Further, transmission 30 may include a plurality of gear clutches that may be engaged as needed to activate a plurality of fixed transmission gear ratios. The output of the torque converter 28 may in turn be controlled by torque converter lock-up clutch 34. For example, when torque converter lock-up clutch 34 is fully disengaged, torque converter 28 transmits engine torque to automatic transmission 30 via fluid transfer between the torque converter turbine and torque converter impeller, thereby enabling torque multiplication. In contrast, when torque converter lock-up clutch 34 is fully engaged, the engine output torque is directly transferred via the torque converter clutch to an input shaft (not shown) of transmission 30. Alternatively, the torque converter lock-up clutch 34 may be partially engaged, thereby enabling the amount of torque relayed to the transmission to be adjusted. A controller may be configured to adjust the amount of torque transmitted by torque converter 28 by adjusting the torque converter lock-up clutch in response to various engine operating conditions, or based on a driver-based engine operation request.

Torque output from the automatic transmission 30 may in turn be relayed to wheels 36 to propel the vehicle. Specifically, automatic transmission 30 may transfer an input driving torque at the input shaft (not shown) responsive to a vehicle traveling condition before transmitting an output driving torque to the wheels. Further, a frictional force may be applied to wheels 36 by engaging wheel brakes 38 coupled to the vehicle wheels. The wheel brakes may be actuated via a brake pedal. In one example, wheel brakes 38 may be engaged in response to the driver, or vehicle operator 130 pressing his foot on a brake pedal 52. In the same way, a frictional force may be reduced to wheels 36 by disengaging wheel brakes 38 in response to the vehicle operator 130 releasing his foot from the brake pedal 52. The position of the brake pedal may be inferred from a brake pressure. In one example, where the brake is coupled to an anti-lock brake system (ABS), the brake pressure may be estimated by the ABS and transmitted from the ABS controller to the engine controller over a controller area network (CAN) as a brake pressure or brake torque signal. Additionally, a brake on/off signal, associated with the signal to the brake lights, may be generated. The brake on/off signal may be used in conjunction with the brake pedal position information to signal the end of a brake pedal travel (or brake pedal event). It will be appreciated that in alternate embodiments, the position of the brake pedal may be determined by a brake pedal position sensor coupled to the brake pedal.

During some conditions, the release of the foot from the wheel brake pedal may also indicate an intention of the driver to restart and possibly launch the vehicle. As such, the wheel brakes 38 may be separate from an electric brake (that is, electrically actuated parking brake) also coupled to the vehicle wheels, as discussed below. The electric brake may be operated in response to a current received from a system battery, or alternate electrical supply.

Vehicle wheel brakes 38 may also apply a frictional force to wheels 36 as part of an automated engine stopping procedure. To assist in keeping the vehicle stationary, a further frictional force may be applied to wheels 36 by operating electric brake (or eBrake) 42. Specifically, in response to an electric brake request, current may be directed from an electrical supply, such as battery 46, to apply the electric brakes. Likewise, current may be directed from the battery to release the electric brakes. In one example, an electric brake request may be determined in response to vehicle operator 130 pressing an eBrake button 56 located on the vehicle dashboard (not shown). As elaborated herein, a controller may be configured to limit a current supplied from the battery to one of the starter motor and the electric brake in response to a request to supply current (or while current is being supplied) to the other of the starter and the electric brake. For example, in response to a tandem engine restart request and an electric brake request, the controller may direct current from the battery to the starter motor and the electric brake sequentially so as to not overload the electrical supply. Based on the timing of the requests in relation to each other, as well as an engine speed and vehicle speed when the requests are received, an order for directing the current sequentially may be selected.

A mechanical oil pump 40 may be in fluid communication with automatic transmission 30 to provide hydraulic pressure to engage various clutches, such as forward clutch 32 and/or torque converter lock-up clutch 34. The mechanical oil pump 40 may be operated in accordance with torque converter 28, and may be driven by the rotation of the engine or transmission input shaft, for example. Thus, the hydraulic pressure generated in mechanical oil pump 40 may increase as an engine speed increases, and may decrease as an engine speed decreases. An electric oil pump 41, also in fluid communication with the automatic transmission but operating independent from the driving force of engine 10 or transmission 30, may be provided to supplement the hydraulic pressure of the mechanical oil pump. Electric oil pump 41 may be driven by an electric motor (not shown) to which an electric power may be supplied, for example by battery 46.

A controller 12 may be configured to receive inputs from engine 10, as shown in more detail in FIG. 2, and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling throttle opening and/or valve timing, valve lift and boost for turbo- or supercharged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

When idle-stop conditions are satisfied, controller 12 may initiate engine shutdown by shutting off fuel and spark to the engine. In one example, to maintain an amount of torsion in the transmission while in idle-stop, the controller may ground rotating elements of transmission 30 to a case of the transmission and thereby to the frame of the vehicle. For example, the controller may engage one or more transmission clutches, such as forward clutch 32, and lock the engaged transmission clutch(es) to the transmission case and vehicle frame. A clutch pressure may be varied (e.g., increased) to adjust the engagement state of a transmission clutch, and provide a desired amount of transmission torsion. During the engine shutdown, hydraulic pressure for clutch modulation may be provided by enabling the electric oil pump 41, if sufficient hydraulic pressure cannot be provided by the mechanical oil pump 40. Additionally, or optionally, if the operator requests further parking brake assistance, the electric brake may be applied once the vehicle is at rest (or below a threshold speed).

During a subsequent automatic restart from engine idle-stop, such as in response to the vehicle operator releasing the foot from the wheel brake pedal, controller 12 may reactivate the engine. The transmission may be maintained tied-up to the transmission case until the engine is reactivated to reduce vehicle lurches and NVH issues during the restart. If an electric brake request is received during the engine cranking, the controller may direct current from the battery to the starter motor to complete the engine restart before directing current to apply the electric brake. Additionally, if the electric brake is applied following the engine restart, vehicle lurches may be controlled via the electric brake and the transmission may be released from the tie-up.

FIG. 2 depicts an example embodiment of a combustion chamber or cylinder of internal combustion engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Note that in some configurations cylinder air charge may be increased via advancing intake valve closing timing with respect to base intake valve closing timing. In other examples, cylinder air charge may be increased via retarding intake valve closing timing with respect to base intake valve closing timing. Therefore, the present description is not limited to a particular configuration where intake valve timing advances or retards to increase cylinder air charge.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory 110 can be programmed with computer readable data representing instructions executable by processor 106 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Figure 3:
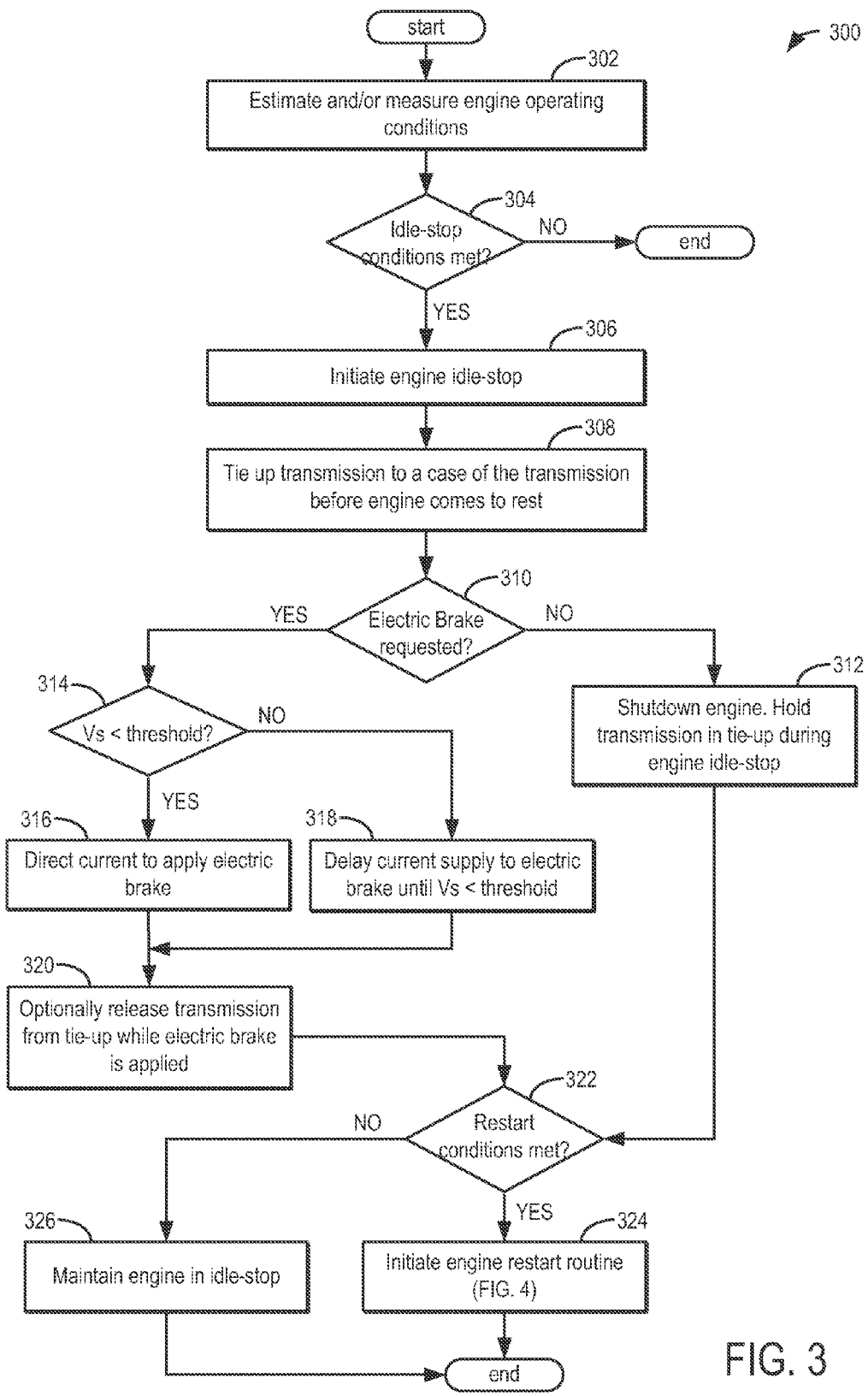
FIG. 3 shows a high level flow chart for adjusting engine operations in response to idle-stop conditions.

Now turning to FIG. 3, an example routine 300 is described for performing an engine shutdown operation and a subsequent engine restart operation. The engine may be shutdown or deactivated in response to a shutdown request received from a vehicle operator, or in response to an automatic controller requested engine stop (e.g., due to selected engine idle-stop conditions being met without a request from the operator). Likewise, the engine may be restarted from the idle-stop condition in response to a restart request from the operator (e.g., as perceived by a change in position of the accelerator pedal and/or brake pedal) or in response to an automatic controller requested restart (e.g., due to selected restart conditions being met without a request from the operator). The routine enables the operation of an electric parking brake to be coordinated with the operation of a starter motor so as to not overload the vehicle system's electrical supply.

At 302, engine operating conditions may be estimated and/or measured. These may include, for example, ambient temperature and pressure, engine temperature, engine speed, vehicle speed, transmission (input and output) speed, battery state of charge, fuels available, fuel alcohol content, etc. At 304, it may be confirmed if idle-stop conditions have been met. Any or all of the idle-stop conditions, as further described herein, may be met for an idle-stop condition to be confirmed. Idle-stop conditions may include, for example, the engine being in an operating status (e.g., carrying out combustion), a battery state of charge (SOC) being more than a threshold (e.g., 30% SOC), vehicle running speed being below a threshold speed (e.g., below 30 mph), no request for air-conditioner operation being received, engine temperature (e.g., as inferred from an engine coolant temperature) being within a selected temperature range (e.g., above a threshold), a throttle opening degree (e.g., as determined by a throttle opening degree sensor) indicative of no start requested by the vehicle driver, a driver requested torque being less than a predetermined threshold, a brake pedal position or brake pressure indicating that the brake pedal has been pressed, an engine speed being below a threshold, an input shaft rotation number being below a predetermined threshold, etc. If idle-stop conditions are not met, the routine may end. However, if any or all of the idle-stop conditions are met, then at 306, the controller may initiate an idle-stop operation by deactivating the engine when low or no engine torque is required. This may include shutting off fuel and/or spark to the engine. Consequently, the engine may start spinning towards rest.

At 308, while the engine is spinning to rest, one or more transmission clutches may be engaged to lock and tie-up the transmission to a transmission case, and thereby to a frame of the vehicle. As such, the transmission may be tied-up before the engine comes to rest. Hydraulic pressure for transmission clutch modulation may be provided by the mechanical oil pump, if possible, or by operating the electric oil pump. By maintaining the transmission tied-up during the idle-stop, and before a subsequent engine restart, at least some torsion may be maintained in the transmission. This can reduce vehicle lurches and NVH issues during the subsequent restart, while also enabling a subsequent vehicle launch to be expedited.

At 310, while the engine is spinning to rest (or after the engine has come to rest and is in idle-stop), it may be determined if an electric brake request has been received. In one example, an electric brake request may be confirmed in response to the vehicle operator pressing an eBrake button on the vehicle dashboard. If an electric brake request is not confirmed, then at 312, the engine may be shutdown (or maintained shutdown) with the transmission maintained in tie-up during the engine idle-stop.

If an electric brake request is confirmed, then at 314, the vehicle speed at the time the electric brake request was received may be estimated, and it may be determined whether the vehicle speed is below a threshold speed. For example, it may be determined whether the electric brake request was received when the vehicle speed was at or near rest. If the vehicle speed is below the threshold speed, for example, if the vehicle has slowed and come to a stop, the routine includes, at 316, directing current from the battery to the electric brake to apply the electric brake. In comparison, if the vehicle speed is higher than the threshold, for example, if the request for activating the brake is received during the engine deactivation when the vehicle has not yet stopped, the routine includes, at 318, delaying current supply to and activation of the electric brake until the vehicle speed is below the threshold (e.g., stopped).

Following applying of the electric brake, at 320, the engine controller may optionally release the transmission from tie-up while the electric brake is applied. Herein, the electric brake may be used to assist in maintaining the vehicle stationary and reducing NVH issues. As such, releasing the transmission from tie-up may further include discontinuing operation of the electric oil pump. For example, while the engine is in idle-stop and the transmission is in a neutral gear, and while the electric brake is applied, a pressure of the transmission clutches may be decreased to release the transmission from the tie-up, and the electric oil pump may be turned off. In another example, an accumulator may be coupled to the transmission to maintain hydraulic line pressure. Additionally, a pressure sensor may be coupled to the hydraulic line to sense hydraulic line pressure and provide an indication in the event of a loss of line pressure. Herein, based upon the hydraulic line pressure, the electric oil pump may be cycled on or off. In this way, by discontinuing electric oil pump operation while the electric brake is applied, fuel economy benefits from not operating the pump may be synergistically achieved.

At 322, while the engine is shutdown in the idle-stop with the electric brake applied (as at 316 or 318), or not applied (as at 312), it may be determined if automatic engine restart conditions have been met. Any or all of the automatic engine restart conditions, as further described herein, may be met for an automatic engine restart condition to be confirmed. Restart conditions may include, for example, the engine being in idle-stop (e.g., not carrying out combustion), the battery state of charge being below a threshold (e.g., less than 30%), vehicle speed being above a threshold, a request for air conditioning being made, engine temperature being below a threshold, emission control device temperature being below a threshold (e.g., below a light-off temperature), vehicle electrical load being above a threshold, the vehicle operator releasing a brake pedal of the wheel brakes and/or an accelerator pedal being pressed, etc. If restart conditions are not met, at 326, the engine may be maintained in the idle-stop status.

Figure 4:
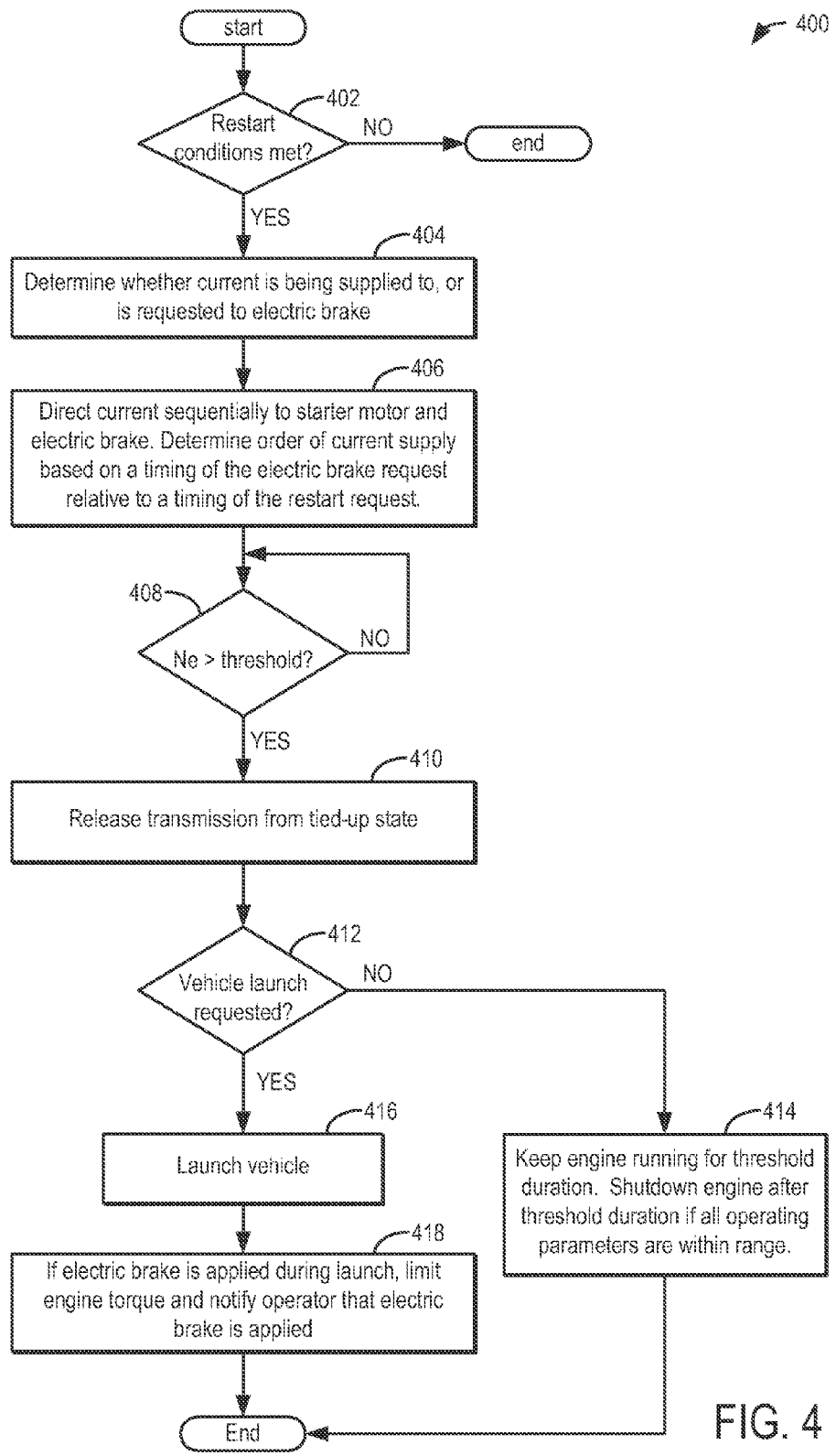
FIG. 4 shows a high level flow chart for adjusting engine operations in response to restart conditions.

In comparison, if any or all of the automatic restart conditions are met, then at 324, an engine restart routine, as elaborated with reference to FIG. 4, may be initiated. Restarting the engine may include cranking the engine (e.g., with starter motor assistance), returning fuel injection and spark ignition to the engine cylinders, and resuming cylinder combustion. In response to the automatic engine reactivation, the engine speed may start to gradually increase.

Now turning to FIG. 4, an example routine 400 is described for automatically restarting an engine from an idle-stop shutdown state. The restart may be coordinated with the application of an electric brake to limit the load applied on a system electrical supply, such as a system battery. The routine of FIG. 4 may be performed as part of the routine of FIG. 3, for example at 324.

At 402 (as at 322 of FIG. 3), automatic engine restart conditions may be confirmed. If restart conditions are not confirmed, the routine may end and the engine may remain in the idle-stop state. At 404, it may be determined whether current is presently being supplied to the electric brake (for example, in response to an electric brake request received before the restart request), or whether a request for supplying current to the brake has been received (for example, around the same time as the restart request). Accordingly, at 406, the routine includes directing current to the starter motor and the electric brake sequentially in response to a request for automatically restarting the engine and activating the electric brake. That is, the controller may be configured to not direct current to the starter motor and the brake simultaneously. The controller may limit a current supplied to one of the starter and the electric parking brake in response to a request to supply current, or while current is being supplied, to the other of the starter and the electric parking brake. In one example, where current is supplied to the starter, to activate the starter motor, and supplied to the electric brake, to apply or release (but not hold) the brake, from a common battery (such as battery 46 of FIG. 1), by disallowing simultaneous current supply to the starter and the parking brake, degradation of the battery can be reduced and the life of the battery may be prolonged.

The routine may further include, at 406, determining an order of supplying the current sequentially based on a timing of the electric brake request relative to a timing of the restart request. For example, during a first condition, when the request to supply current to the starter (that is, the engine restart request) is received within a threshold duration since current supply to the brake was started (that is, a threshold duration since the electric brake request), the controller may limit current supplied to the electric brake and redirect the remaining current to the starter. In one example, if the request to supply current to the starter is received at the same time as the request to supply current to the brake, the controller may limit current to the electric brake. In comparison, during a second condition, when the request to supply current to the starter is received after the threshold duration since current supply to the electric brake was started, the controller may limit current to the starter motor and continue to direct the remaining current to the electric brake. The controller may then supply current to the starter motor after the electric brake has been engaged (or applied). In one example, where the request to supply current to the starter is received when the electric brake is almost fully engaged (but not yet fully engaged), the controller may direct current to the brake to complete the electric brake operation before directing current to the starter. That is, the restart may be delayed until the brake has been engaged.

Upon supplying current to the starter motor, the engine may be automatically restarted. This may include, in one example, cranking the engine with the transmission tied to a transmission case. As elaborated in FIG. 3, the transmission may have been tied to the transmission case during an engine shutdown immediately preceding the automatic engine restart by engaging one or more transmission clutches. However, in alternate embodiments, the transmission may have been released from the tie-up if the electric brake was engaged during the idle-stop.

At 408, an engine speed may be estimated and it may be confirmed that a threshold engine speed has been reached. In one example, the threshold engine speed may be an engine idling speed. Upon confirmation, at 410, the transmission may be released from the tie-up (if the engine was restarted with the transmission tied-up) in response to the engine speed being above the threshold engine speed. Herein, releasing the transmission from the tie-up may include disengaging one or more transmission clutches.

At 412, it may be determined if a vehicle launch has been requested. In one example, a vehicle launch may be requested in response to the vehicle operator pressing the accelerator pedal (e.g., beyond a threshold pedal position). In another example, a vehicle launch may be determined based on a rate of change in the operator torque demand (e.g., the rate being higher than a threshold). If a vehicle launch is requested, then at 416, the vehicle may be launched. This may include appropriately adjusting one or more transmission gear clutches to launch the vehicle.

At 418, it may be determined if the electric brake was applied or engaged during the vehicle launch, and if so, the engine torque may be limited. Additionally, the vehicle operator may be notified that the electric brake is applied, for example, by illuminating an indicator light on the vehicle dashboard. In an alternate example, if the electric brake was applied when the vehicle launch was requested, the controller may automatically release the electric brake (for example, after a threshold duration since the vehicle launch) without limiting engine torque to improve the quality of the vehicle launch.

If a vehicle launch is not requested after the engine restart, then at 414, the controller may continue running the engine for a threshold duration and shutdown the engine after the threshold duration if all engine operating parameters are within range. For example, the controller may start a timer once the engine has been restarted or after the engine has reached a threshold speed (e.g., an idling speed). If a threshold time has elapsed since the timer was started and no vehicle launch was requested, the controller may verify engine operating parameters, such as a battery state of charge. The engine operating parameters may be the parameters estimated to confirm idle-stop conditions, for example. If the engine operating parameters are in the desired range, the controller may proceed to shutdown the engine (for example, by initiating an engine idle-stop operation). Else, the controller may continue running the engine until the parameters are brought within the desired range following which the engine may be shutdown.

In this way, current may be sequentially delivered to a starter motor and an electric brake from a common current supply by assigning priority to either the starter motor or the electric brake based on engine operating conditions. By varying the assignment of priority based on a timing of a restart request relative to an electric brake request, as well as a vehicle speed, the restart may be coordinated with the application of the electric brake without overloading the common current supply.

Figure 5:
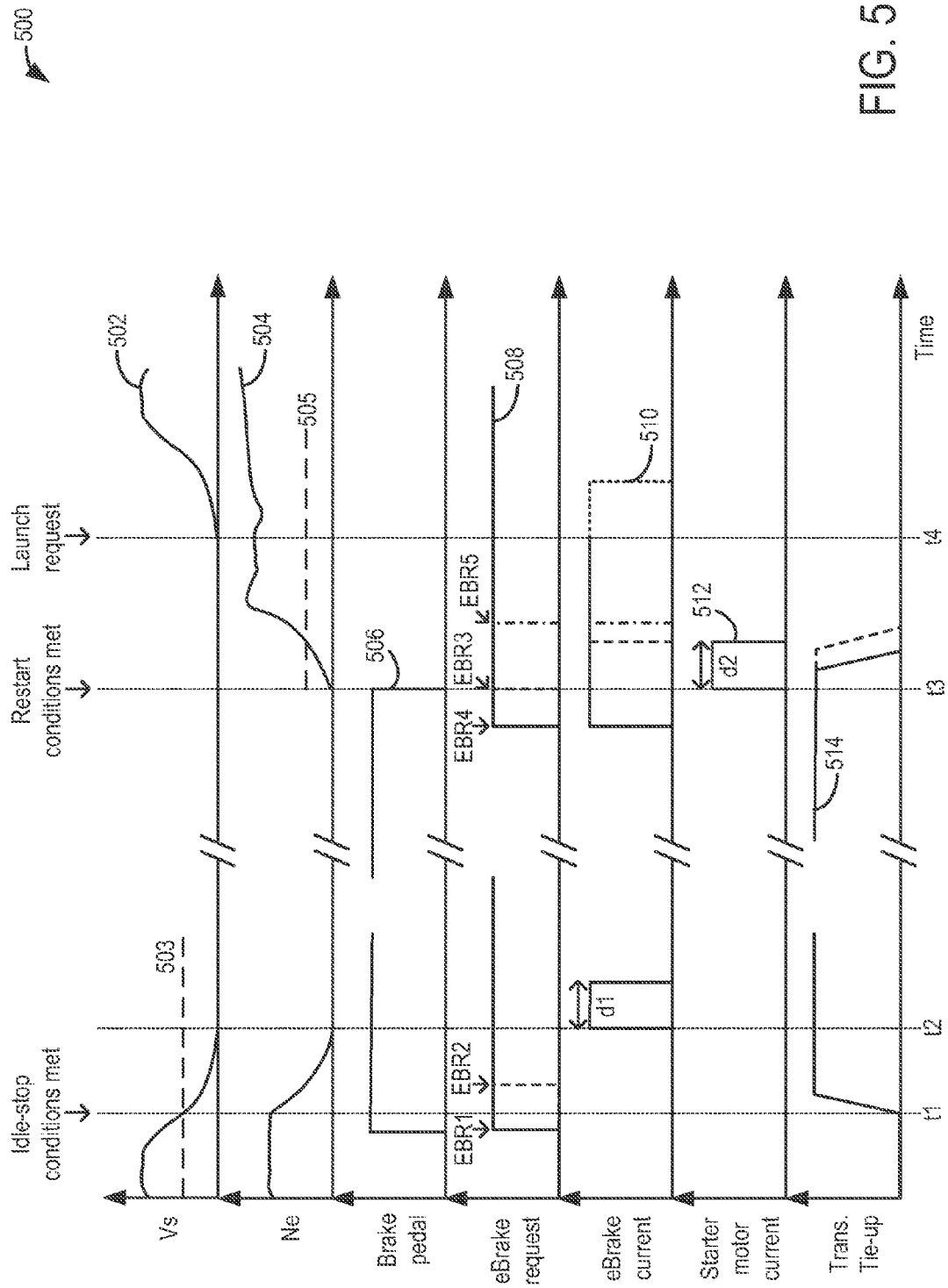
FIG. 5 shows a map with a plurality of graphs explaining example engine shut-down and restart operations, according to the present disclosure.

The concepts introduced in the routines of FIGS. 3-4 are now further clarified with example engine shut-down and restart scenarios in FIG. 5. Specifically, FIG. 5 includes a map 500 depicting multiple example shutdown and restart scenarios. Changes in vehicle speed (Vs) over time are shown in graph 502. Corresponding changes in engine speed (Ne) are shown at graph 504. A wheel brake pedal status is depicted at graph 506. Various electric brake requests are depicted at graph 508. A current supply directed to the electric brake (eBrake current) is depicted at graph 510 while a current supply directed to the starter motor (starter motor current) is depicted at graph 512. A transmission tie-up state is shown in graph 514.

In the depicted example, a vehicle operator may apply the wheel brake pedal before t1 (graph 506). As a result the vehicle may start to decelerate with the vehicle speed gradually decreasing to rest (graph 502). In response to the vehicle speed falling below a threshold speed 503, idle-stop conditions may be confirmed. Accordingly, at t1, the engine may be deactivated and the engine may start spinning towards rest (graph 504). As the engine spins to rest, but before it comes to a complete rest, the transmission may be tied-up to a transmission case (and thereby to a frame of the vehicle) during the idle-stop (graph 514). A hydraulic pressure required to tie-up the transmission may be provided by the mechanical oil pump, if possible, and/or by operating the electric oil pump. The transmission may then remain tied up until a subsequent restart operation.

First, electric brake requests received during engine shutdown conditions will be described. For example, an electric brake request (electric brake request EBR1) may be received before t1 (depicted by solid line of graph 508). Herein, even though the electric brake request is received before t1, current may not be directed to the electric brake until the vehicle has come to rest at t2 (depicted by solid line of graph 510). Current may be directed to the electric brake for a duration d1 required to apply the brake, following which the current may be removed and the brake may be held in the engaged position. Alternatively, an electric brake request (electric brake request EBR2) may be received after t1, during the engine idle-stop while the engine is spinning down to rest (depicted by dashed line of graph 508). Herein, as with the previous electric brake request, a supply of current to the electric brake may be delayed until the vehicle has come to rest at t2 (depicted by solid line of graph 510).

Following t2, the engine may remain shutdown with the transmission tied up and/or the electric brake engaged. In one example, as depicted, the electric brake request may be removed after t2 but before a subsequent restart. Herein the vehicle may be held stationary by keeping the transmission tied-up. In an alternate example, the electric brake request may be maintained until a subsequent engine restart wherein the vehicle may be held stationary using the electric brake while releasing the transmission from the tie-up. In still another example, both the electric brake may be applied and the transmission may be maintained tied up over the entire duration of the idle-stop.

At t3, the vehicle operator may release the wheel brake pedal (graph 506) thereby providing an engine restart request. Accordingly, a request to supply current to the starter motor may be inferred. An electric brake request (electric brake request EBR3) may also have been received at t3 (see dashed line of graph 508). Accordingly, in response to the restart request having been received at the same time as the electric brake request, the controller may initially direct current to the starter motor (graph 512) and then, after directing current to the starter motor for a duration d2, direct current to the electric brake after releasing current from the starter motor (see dashed line of graph 510).

As the starter motor is operated and the engine is cranked, the engine speed (graph 504) may start to increase. During the engine restart, when the engine speed reaches a threshold speed 505, the transmission may be released from the tie-up (as shown at graph 514). Alternatively, the transmission may remain tied up until the electric brake has been applied and then released from the tie-up so that the vehicle is held stationary by at least one of the electric brake and the transmission tie-up.

In an alternate example, an electric brake request (electric brake request EBR4) may be received before the brake pedal is released. However, the restart request may have been received after a threshold duration since the electric brake request wherein the threshold duration is a duration after which the controller is committed to engaging the electric brake. Accordingly, the controller may assign priority to the electric brake. Consequently, a current supplied to the electric brake may be continued and current directed to the starter motor may be limited until the electric brake is engaged. Then, after releasing current from the electric brake, the current may be redirected to the starter motor.

Alternatively, the electric brake request may be received before the brake pedal is released but before the threshold duration since the electric brake request (not shown). Herein, sufficient time may not have elapsed to commit the controller to engaging the electric brake. Accordingly, the controller may assign priority to the starter motor. Consequently, a current supplied to the electric brake may be limited and current may be directed to the starter motor and then, after releasing current from the starter motor, the current may be redirected to the electric brake.

In yet another example, an electric brake request (electric brake request EBR5) may be received after the brake pedal is released and after the starter motor has operated to crank the engine (see dashed and dotted line of graph 508). Herein, in the absence of a restart request, current may be supplied to the electric brake.

At t4, the vehicle operator may press an accelerator pedal to request a vehicle launch (without first releasing the electric brake). In response to the vehicle launch request, the vehicle speed may increase and the vehicle may be launched with the electric brake still engaged. However, engine torque conveyed to the wheels may be limited and the vehicle operator may be notified that the electric brake is still engaged (e.g., a diagnostic code may be set). Alternatively, after a threshold duration since the vehicle launch, the electric brake may be automatically released by applying a current (see dotted line of graph 510).

In this way, a current directed to a starter motor may be limited when current is supplied to an electric brake, and a current directed to the electric brake may be limited when current is supplied to the starter motor. By directing current to the starter and the electric brake sequentially, both electrical components can be operated without overloading a vehicle system's electrical supply. By coordinating the directing of the current from a current supply to the electric brake and the starter based on a restart request and a parking request, the quality of the engine restart as well as the parking brake assist can be improved.

Note that the example control and estimation methods included herein can be used with various engine and/or vehicle system configurations. The specific methods described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine, comprising:
   during an engine restart, cranking an engine via a starter while limiting current supplied to an electrically-actuated parking brake; and
   in a first mode, releasing elements of a transmission that rotate from being grounded to a transmission case in response to the electrically-actuated parking brake being applied during the restart.

2. The method of claim 1, wherein the engine restart is based on a driver releasing a brake pedal.

3. The method of claim 1, wherein current supplied to the electrically-actuated parking brake releases or applies the electrically-actuated parking brake.

4. The method of claim 1, wherein the engine is further coupled to the transmission, and wherein during a second mode, restarting the engine includes cranking the engine with the elements of the transmission that rotate being grounded to the transmission case and releasing the elements of the transmission that rotate from being grounded to the transmission case above a threshold engine speed.

5. The method of claim 4, wherein the elements of the transmission that rotate are tied to the transmission case during an engine shutdown immediately preceding an automatic vehicle engine restart.

6. The method of claim 4, wherein tying up the elements of the transmission that rotate includes engaging one or more transmission clutches, and wherein releasing the elements of the transmission that rotate from the tie-up includes disengaging the one or more transmission clutches.

7. The method of claim 1, wherein current is directed to a starter motor and the electrically-actuated parking brake from a common battery.

8. The method of claim 1, wherein the engine communicates torque to wheels and where the wheels include wheel brakes that are separate from the electrically-actuated parking brake, and wherein the engine restart is initiated by a vehicle operator releasing a brake pedal of the wheel brakes.

9. The method of claim 1, further comprising not directing current to the starter motor and the electrically-actuated parking brake simultaneously.

10. The method of claim 1, further comprising, in response to a request for activating the electrically-actuated parking brake received during an engine deactivation, delaying activation of the electrically-actuated parking brake until vehicle speed is below a threshold, and where a driver's request to activate the electrically-actuated parking brake is via a push button.

11. A vehicle system, comprising:
an engine coupled to a transmission;
a battery;
a wheel brake coupled to vehicle wheels, the wheel brake actuated via a brake pedal;
an electrically-actuated parking brake coupled to vehicle wheels, the electrically-actuated parking brake operated in response to a current received from the battery;
a starter motor operated in response to a current received from the battery; and a control system with computer readable instructions for:
in response to releasing the wheel brakes while an electrically-actuated parking brake is applied, supplying current to the starter motor and limiting current supplied to the electrically-actuated parking brake; and
assigning priority to supply the starter motor current if a request to supply current to the electrically-actuated parking brake is received after a request to supply current to the starter motor.

12. The system of claim 11, wherein the wheel brakes are released via a vehicle operator releasing the brake pedal.

13. The system of claim 11, wherein the control system holds further instructions for cranking the engine when current is supplied to the starter motor while transmission elements that rotate are tied up to a transmission case, and releasing the transmission from the tie-up when engine speed is above a threshold.

* * * * *